United States Patent
Benes et al.

(10) Patent No.: US 10,911,256 B2
(45) Date of Patent: Feb. 2, 2021

(54) CONSUMER DIRECTED ENERGY MANAGEMENT SYSTEMS AND METHODS

(71) Applicant: Tendril Networks, Inc., Boulder, CO (US)

(72) Inventors: Charles Reid Benes, Denver, CO (US); Rebecca Fay Premus, Broomfield, CO (US); Michael Kent Ruth, Longmont, CO (US); Carol L. Stimmel, Boulder, CO (US); Adrian Christopher Tuck, Longmont, CO (US); Andrew James Wheeler, San Francisco, CA (US)

(73) Assignee: Tendril EA, LLC, Boulder, CO (US)

( * ) Notice: Subject to any disclaimer, the term of this patent is extended or adjusted under 35 U.S.C. 154(b) by 0 days.

(21) Appl. No.: 15/654,460

(22) Filed: Jul. 19, 2017

(65) Prior Publication Data
US 2018/0131537 A1    May 10, 2018

Related U.S. Application Data

(63) Continuation of application No. 12/555,751, filed on Sep. 8, 2009, now Pat. No. 9,722,813.
(Continued)

(51) Int. Cl.
*H04L 12/28* (2006.01)
(52) U.S. Cl.
CPC .. *H04L 12/2818* (2013.01); *G05B 2219/2639* (2013.01); *H04L 2012/285* (2013.01)
(58) Field of Classification Search
CPC .......... H04L 12/2818; H04L 2012/285; G05B 2219/2639
See application file for complete search history.

(56) References Cited

U.S. PATENT DOCUMENTS 4,401,943 A    8/1983   Morris et al.
5,179,556 A    1/1993   Turner
(Continued)

FOREIGN PATENT DOCUMENTS

| WO | 0074306 | 12/2000 |
|---|---|---|
| WO | 2012068503 A1 | 5/2012 |
| WO | 2014085777 A1 | 6/2014 |

OTHER PUBLICATIONS

Ahmad et al. "Computation intelligence techniques for HVAC systems: A review." Building Simulation, Tsinghua University Press, vol. 9, No. 4, Mar. 31, 2016, pp. 359-398, 40 pages.
(Continued)

*Primary Examiner* — Christopher E. Everett
(74) *Attorney, Agent, or Firm* — Perkins Coie LLP (57) ABSTRACT

Methods and systems for providing consumer directed energy management are described. Consumer defined triggers provide consumers and utilities with the ability to control residential energy usage, by managing manage multiple residential load control elements. A user interface is provided separately from the load control elements to allow the consumer to define his or her schedule and preferences for the purposes of controlling the multiple load control elements. In addition, settings on load control elements can be automatically adjusted based on information about consumer schedules and preferences obtained from other sources. In some embodiments, a utility interface allows utilities to implement improved energy load control. When a utility expects to implement a load control event, the utility can monitor consumer schedules and/or preferences, in order to achieve the desired energy reduction while reducing the impact on participating consumers' comfort.

20 Claims, 7 Drawing Sheets

| Consumer Identifier | Trigger | Trigger Level(s) | Action(s) |
|---|---|---|---|
| consumer1 | Price | $0.35 | Set cooling setpoint to 80°. |
| consumer1 | WindPower | 15% | Set cooling setpoint to 75°. |
| consumer2 | Schedule | Asleep | Turn off TV outlet. Set heating setpoint to 62°. |
| consumer2 | CriticalityEvent | High | Turn off washing machine and dryer. |

Related U.S. Application Data (60) Provisional application No. 61/095,244, filed on Sep. 8, 2008.

(56) References Cited

U.S. PATENT DOCUMENTS

| | | | |
|---|---|---|---|
| 5,510,975 A | 4/1996 | Ziegler | |
| 5,572,438 A | 11/1996 | Ehlers et al. | |
| 5,684,710 A | 11/1997 | Ehlers et al. | |
| 5,696,695 A | 12/1997 | Ehlers et al. | |
| 5,719,861 A | 2/1998 | Okanoue | |
| 5,865,991 A | 2/1999 | Hsu | |
| 5,924,486 A | 7/1999 | Ehlers et al. | |
| 5,949,976 A | 9/1999 | Chappelle | |
| 5,959,529 A | 9/1999 | Kail, IV | |
| 6,028,857 A | 2/2000 | Poor | |
| 6,092,207 A | 7/2000 | Kolinski et al. | |
| 6,178,362 B1 | 1/2001 | Woolard et al. | |
| 6,208,247 B1 | 3/2001 | Agre et al. | |
| 6,216,956 B1 | 4/2001 | Ehlers et al. | |
| 6,498,955 B1 | 12/2002 | McCarthy et al. | |
| 6,631,309 B2 | 10/2003 | Boies et al. | |
| 6,640,248 B1 | 10/2003 | Jorgensen | |
| 6,680,922 B1 | 1/2004 | Jorgensen | |
| 6,684,339 B1 | 1/2004 | Willig | |
| 6,754,504 B1 | 6/2004 | Reed | |
| 6,785,592 B1 | 8/2004 | Smith et al. | |
| 6,859,831 B1 | 2/2005 | Gelvin et al. | |
| 6,947,483 B2 | 9/2005 | Engwer | |
| 7,058,657 B1 | 6/2006 | Berno | |
| 7,062,389 B2 | 6/2006 | Johnson et al. | |
| 7,130,719 B2 | 10/2006 | Ehlers et al. | |
| 7,171,287 B2 | 1/2007 | Weiss | |
| 7,216,021 B2 | 5/2007 | Matsubara et al. | |
| 7,245,947 B2 | 7/2007 | Salokannel et al. | |
| 7,263,450 B2 | 8/2007 | Hunter | |
| 7,266,428 B2 | 9/2007 | Alexanian | |
| 7,302,634 B2 | 11/2007 | Lucovsky et al. | |
| 7,333,821 B2 | 2/2008 | Willey | |
| 7,356,548 B1 | 4/2008 | Culp et al. | |
| 7,364,093 B2 * | 4/2008 | Garozzo | G05D 23/1905 236/46 R |
| 7,505,852 B2 | 3/2009 | Board | |
| 7,539,488 B2 | 5/2009 | Friedman | |
| 7,552,033 B1 | 6/2009 | Culp et al. | |
| 7,769,611 B1 * | 8/2010 | Rodriguez | G06Q 10/02 705/7.11 |
| 7,966,104 B2 | 6/2011 | Srivastava et al. | |
| 8,010,240 B2 | 8/2011 | Mattiocco et al. | |
| 8,014,905 B2 * | 9/2011 | Ehlers | H02J 3/14 307/24 |
| 8,121,741 B2 | 2/2012 | Taft et al. | |
| 8,175,756 B2 | 5/2012 | Musti et al. | |
| 8,176,095 B2 | 5/2012 | Murray et al. | |
| 8,239,046 B2 | 8/2012 | Koehler et al. | |
| 8,265,776 B2 | 9/2012 | Osann et al. | |
| 8,301,921 B2 | 10/2012 | Goodnow et al. | |
| 8,332,055 B2 | 12/2012 | Veillette | |
| 8,510,255 B2 | 8/2013 | Fadell et al. | |
| 8,515,878 B2 | 8/2013 | Radloff et al. | |
| 8,543,251 B2 | 9/2013 | Plant | |
| 8,549,335 B2 | 10/2013 | Goodnow et al. | |
| 8,554,376 B1 | 10/2013 | Matsuoka et al. | |
| 8,560,128 B2 | 10/2013 | Ruff et al. | |
| 8,583,531 B2 | 11/2013 | Hirl et al. | |
| 8,674,843 B2 | 3/2014 | Bhageria et al. | |
| 8,730,057 B2 | 5/2014 | Dalla | |
| 8,761,945 B2 | 6/2014 | Hadzidedic et al. | |
| 8,872,667 B2 | 10/2014 | Bhageria et al. | |
| 8,892,264 B2 | 11/2014 | Steven et al. | |
| 8,977,404 B2 | 3/2015 | Benes et al. | |
| 9,003,343 B2 | 4/2015 | Zhou et al. | |
| 9,007,077 B2 | 4/2015 | Ei-Essawy et al. | |
| 9,026,261 B2 | 5/2015 | Bukhin et al. | |
| 9,244,446 B2 | 1/2016 | Bhageria et al. | |
| 9,256,908 B2 | 2/2016 | Dai et al. | |
| 9,298,197 B2 | 3/2016 | Fisher et al. | |
| 9,310,815 B2 | 4/2016 | Shiflet | |
| 9,329,212 B2 | 5/2016 | Benes et al. | |
| 9,423,779 B2 | 8/2016 | Agarwal | |
| 9,471,718 B2 | 10/2016 | Bukhin et al. | |
| 9,576,472 B2 | 2/2017 | Koch | |
| 9,696,055 B1 | 7/2017 | Goodman et al. | |
| 9,722,813 B2 | 8/2017 | Benes et al. | |
| 9,785,129 B2 | 10/2017 | Bhageria et al. | |
| 9,923,416 B2 | 3/2018 | Bhageria et al. | |
| 10,007,243 B2 | 6/2018 | Bhageria et al. | |
| 10,281,895 B2 | 5/2019 | Agarwal | |
| 10,379,508 B2 | 8/2019 | Shiflet | |
| 10,697,662 B2 | 6/2020 | Matsuoka et al. | |
| 10,708,077 B2 | 7/2020 | Cui et al. | |
| 10,782,666 B2 | 9/2020 | Agarwal | |
| 2002/0002636 A1 | 1/2002 | Vange et al. | |
| 2002/0071398 A1 | 6/2002 | Moran et al. | |
| 2002/0158763 A1 | 10/2002 | Takarada et al. | |
| 2003/0069970 A1 | 4/2003 | Kim et al. | |
| 2003/0083758 A1 | 5/2003 | Williamson | |
| 2003/0190912 A1 | 10/2003 | Jampolsky et al. | |
| 2003/0191955 A1 | 10/2003 | Wagner et al. | |
| 2003/0216837 A1 | 11/2003 | Reich et al. | |
| 2004/0034684 A1 | 2/2004 | Payne | |
| 2004/0117330 A1 | 6/2004 | Ehlers et al. | |
| 2004/0133314 A1 | 7/2004 | Ehlers et al. | |
| 2004/0138981 A1 | 7/2004 | Ehlers et al. | |
| 2004/0139038 A1 | 7/2004 | Ehlers et al. | |
| 2004/0249515 A1 | 12/2004 | Johnson et al. | |
| 2004/0260411 A1 | 12/2004 | Cannon | |
| 2004/0262410 A1 | 12/2004 | Hull | |
| 2005/0038571 A1 | 2/2005 | Brickfield et al. | |
| 2005/0043829 A1 | 2/2005 | Rossides | |
| 2005/0055137 A1 | 3/2005 | Andren et al. | |
| 2005/0060107 A1 | 3/2005 | Rodenberg et al. | |
| 2005/0095978 A1 | 5/2005 | Blunn et al. | |
| 2005/0096060 A1 | 5/2005 | Rajkotia et al. | |
| 2005/0096857 A1 | 5/2005 | Hunter | |
| 2005/0124358 A1 | 6/2005 | Willey | |
| 2005/0125083 A1 * | 6/2005 | Kiko | G05B 15/02 700/19 |
| 2005/0157723 A1 | 7/2005 | Kim et al. | |
| 2005/0171645 A1 * | 8/2005 | Oswald | G05B 15/02 700/276 |
| 2006/0005046 A1 | 1/2006 | Hars | |
| 2006/0143600 A1 | 6/2006 | Cottrell et al. | |
| 2006/0200542 A1 | 9/2006 | Willig | |
| 2006/0200658 A1 | 9/2006 | Penkethman | |
| 2006/0209789 A1 | 9/2006 | Gupta et al. | |
| 2006/0276938 A1 * | 12/2006 | Miller | G06Q 50/06 700/295 |
| 2007/0043477 A1 | 2/2007 | Ehlers et al. | |
| 2007/0043478 A1 * | 2/2007 | Ehlers | F24F 11/30 700/276 |
| 2007/0045431 A1 | 3/2007 | Chapman et al. | |
| 2007/0097993 A1 * | 5/2007 | Bojahra | H04L 41/00 370/401 |
| 2007/0173978 A1 | 7/2007 | Fein et al. | |
| 2007/0174644 A1 | 7/2007 | Willig | |
| 2007/0239317 A1 | 10/2007 | Bogolea et al. | |
| 2007/0251461 A1 | 11/2007 | Reichard et al. | |
| 2008/0021749 A1 | 1/2008 | Hope et al. | |
| 2008/0065816 A1 | 3/2008 | Seo | |
| 2008/0129495 A1 | 6/2008 | Hitt | |
| 2008/0256445 A1 | 10/2008 | Ziff et al. | |
| 2008/0263196 A1 | 10/2008 | Kansal et al. | |
| 2008/0271123 A1 * | 10/2008 | Ollis | G08C 17/02 726/4 |
| 2008/0277486 A1 | 11/2008 | Seem et al. | |
| 2008/0300906 A1 | 12/2008 | Doi et al. | |
| 2008/0306985 A1 | 12/2008 | Murray et al. | |
| 2009/0007706 A1 | 1/2009 | Hitt et al. | |
| 2009/0045256 A1 | 2/2009 | McInerney et al. | |
| 2009/0059842 A1 | 3/2009 | Maltseff et al. | |
| 2009/0115597 A1 | 5/2009 | Glacalone | |
| 2009/0135018 A1 | 5/2009 | Veillette et al. | |
| 2009/0135836 A1 | 5/2009 | Veillette | |

(56) References Cited

U.S. PATENT DOCUMENTS

| | | | |
|---|---|---|---|
| 2009/0320012 A1 | 12/2009 | Lee et al. | |
| 2010/0010678 A1 | 1/2010 | Dawson et al. | |
| 2010/0031324 A1 | 2/2010 | Stich et al. | |
| 2010/0042453 A1 | 2/2010 | Scaramellino et al. | |
| 2010/0042720 A1 | 2/2010 | Stienhans et al. | |
| 2010/0070101 A1 | 3/2010 | Benes et al. | |
| 2010/0070102 A1 | 3/2010 | Benes et al. | |
| 2010/0097225 A1 | 4/2010 | Petricoin | |
| 2010/0100253 A1 | 4/2010 | Fausak et al. | |
| 2010/0107112 A1 | 4/2010 | Jennings et al. | |
| 2010/0156665 A1 | 6/2010 | Krzyzanowski et al. | |
| 2011/0029341 A1 | 2/2011 | Muse et al. | |
| 2011/0032070 A1 | 2/2011 | Bleile et al. | |
| 2011/0040785 A1 | 2/2011 | Steenberg et al. | |
| 2011/0046805 A1 | 2/2011 | Bedros et al. | |
| 2011/0144932 A1 | 6/2011 | Alles | |
| 2011/0166710 A1 | 7/2011 | Kordik et al. | |
| 2011/0227417 A1* | 9/2011 | Walker | H02J 3/383 307/72 |
| 2011/0231320 A1 | 9/2011 | Irving | |
| 2011/0251807 A1 | 10/2011 | Rada et al. | |
| 2011/0289019 A1 | 11/2011 | Radloff et al. | |
| 2011/0313964 A1 | 12/2011 | Sanchey Loureda et al. | |
| 2012/0029717 A1 | 2/2012 | Cox et al. | |
| 2012/0053740 A1 | 3/2012 | Venkatakrisnnan et al. | |
| 2012/0065789 A1 | 3/2012 | Scelzi et al. | |
| 2012/0079092 A1 | 3/2012 | Woxblom et al. | |
| 2012/0101651 A1* | 4/2012 | Haynes | H02J 3/14 700/295 |
| 2012/0173456 A1 | 7/2012 | Hirl | |
| 2012/0203379 A1 | 8/2012 | Sloo et al. | |
| 2012/0246279 A1 | 9/2012 | Zang et al. | |
| 2012/0316687 A1 | 12/2012 | Chen et al. | |
| 2012/0323637 A1 | 12/2012 | Cushing et al. | |
| 2013/0013121 A1 | 1/2013 | Henze et al. | |
| 2013/0103207 A1 | 4/2013 | Ruff et al. | |
| 2013/0170481 A1 | 7/2013 | Crawford et al. | |
| 2013/0178986 A1 | 7/2013 | Lombard et al. | |
| 2014/0101082 A1 | 4/2014 | Matsuoka et al. | |
| 2014/0222241 A1 | 8/2014 | Ols | |
| 2014/0277761 A1 | 9/2014 | Matsuoka et al. | |
| 2014/0297001 A1 | 10/2014 | Silverman et al. | |
| 2014/0309869 A1 | 10/2014 | Ricci | |
| 2014/0309892 A1 | 10/2014 | Ricci | |
| 2014/0371921 A1 | 12/2014 | Weaver et al. | |
| 2015/0032264 A1 | 1/2015 | Emmons et al. | |
| 2015/0100167 A1 | 4/2015 | Sloo et al. | |
| 2015/0168002 A1 | 6/2015 | Plitkins et al. | |
| 2015/0178421 A1 | 6/2015 | Borrelli et al. | |
| 2015/0198346 A1 | 7/2015 | Vedpathak | |
| 2015/0248118 A1 | 9/2015 | Li et al. | |
| 2015/0277409 A1 | 10/2015 | Yamada | |
| 2015/0369847 A1 | 12/2015 | Roosli | |
| 2016/0088438 A1 | 3/2016 | Okeeffe | |
| 2016/0131388 A1 | 5/2016 | Eiynk et al. | |
| 2016/0201934 A1 | 7/2016 | Hester et al. | |
| 2016/0313751 A1 | 10/2016 | Risbeck et al. | |
| 2017/0055126 A1 | 2/2017 | O'Keeffe | |

OTHER PUBLICATIONS

An, Lianjun et al. "An inverse PDE-ODE model for studying building energy demand." Proceedings of the 2013 Winter Simulation Conference, Dec. 8, 2013, pp. 1869-1880, 12 pages.

De Angelis et al. Optimal Home Energy Management Under Dynamic Electrical and Thermal Constraints, IEEE Transactions on Industrial Informatics; vol. 9, Iss. 3; 1518-1527, 2012, 12 pages.

European Patent Office, Extended European Search Report, EP Patent Application 17776874.4, dated Nov. 13, 2019, 13 pages.

International Search Report and Written Opinion dated Jun. 21, 2017, for International Patent Application No. PCT/US2017/025606filed Mar. 31, 2017, 53 pages.

Vakiloroaya et al. A review of different strategies for HVAC energy saving. Energy, Conversion and Management; vol. 77; 735-754, 2014, 19 pages.

Bullis, Kevin, "Dumb Meters Get Smarter," <http://www.technologyreview.com/energy/22366>, Mar. 31, 2009, 2 pages.

Dave's Tech Blog, "Itron Remote Read Electric Meter," <http://davestech.blogspot.com/2008/02/itron-remote-read-electric-meter.html>, internet accessed on Nov. 8, 2010, 22 pages.

Doebber, I. "Investigation of Concrete Wall Systems for Reducing Heating and Cooling Requirements in Single Family Residences" [online], Sep. 2004 [retrieved on Mar. 9, 2014]. Retrieved from the Internet:<URL: http://scholar.lib.vt.edu/theses/available/.

Extended European Search Report; European Patent Application No. 13824847.1; dated Jun. 7, 2016; 7 pages.

Hancock, Gregory, "Power monitoring to the people!" <http:/www.gridinsight.com/2009/02/power-monitoring-to-the-people.html>, Feb. 25, 2009, 4 pages.

"http://blog.microsoft-hohm.com/Hohm-energy-report-sample.aspx, accessed on Aug. 9, 2010".

"http://efficiency20.com/, accessed on Aug. 9, 2010".

"http://hes.lbl.gov/consumer, accessed on Aug. 9, 2010".

"http://onzo.com/solutions/, accessed on Aug. 9, 2010".

"http://silverspringnetworks.com/products/index.html, accessed on Aug. 9, 2010".

"http://www.agilewaves.com/, accessed on Aug. 9, 2010".

"http://www.alertme.com/, accessed on Aug. 9, 2010".

"http://www.ambientdevices.com/products/energyjoule.html, accessed on Aug. 9, 2010".

"http://www.bluelineinnovations.com, accessed on Aug. 9, 2010".

"http://www.consert.com/, accessed on Aug. 9, 2010".

"http://www.diykyoto.com/, accessed on Aug. 9, 2010".

"http://www.energy-aware.com/, accessed on Aug. 9, 2010".

"http://www.energyhub.net, accessed on Aug. 9, 2010".

"http://www.google.com/powermeter/about/, accessed on Aug. 9, 2010".

"http://www.greenenergyoptions.co.uk/, accessed on Aug. 9, 2010".

"http://www.lem.com/hq/en/content/view/276/215/, accessed on Aug. 9, 2010".

"http://www.opower.com/Products/Overview.aspx, accessed on Aug. 9, 2010".

"http://www.powermand.com/dreamwatts-product, accessed on Aug. 9, 2010".

"http://www.tendrilinc.com/products/vision/,accessed on Aug. 9, 2010".

"http://www.theenergydetective.com/home, accessed on Aug. 9, 2010".

"http://www.theowl.com/, accessed on Aug. 9, 2010".

International Preliminary Report on Patentability and Written Opinion; International Patent Application No. PCT/US2013/053317; Applicant Tendril Networks, Inc.; dated Feb. 12, 2015; 8 Pages.

International Search Report and Written Opinion; International Application No. PCT/US2011/061470; dated Apr. 9, 2014; 9 pages.

James Broberg, Rajkumar Buyya, Zhair Tarik; MetaCDN: Harnessing 'Storage Clouds' for high performance content delivery; online publication dated; Apr. 5, 2009: http://www.sciencedirect.com/science/article/pii/S1084804509000514.

Kennedy, James and Russell Eberhart. "Particle Swarm Optimization," Proceedings of the IEEE International Conference on Neural Networks (Perth, Australia), 1995, pp. 1942-1948, 7 pages.

Retzlaff, et al. Conservation & Energy Potential Study for Smith River Rancheria:, Smith River Rancheria, Evergreen NRG/Strategic Energy Solutions, Aug. 2005, 417 pages.

U.S. Appl. No. 61/446,233; Inventor: Henze; filed Feb. 24, 2011, 17 pages.

Econorthwest, "Process Evaluation of the SCE Aug. 2006 Home Energy Efficiency Survey (HEES) Program," Aug. 2009. <URL: http://www.calmac.org/publications/SCE_HEES_Final_Report_080409_calmac_edit.pdf> entire document, 121 Pages.

WIPO International Search Report and Written Opinion, PCT/US2014/029543, dated Sep. 19, 2014, 12 pages.

* cited by examiner

| Consumer Identifier | Trigger | Trigger Level(s) | Action(s) |
|---|---|---|---|
| consumer1 | Price | $0.35 | Set cooling setpoint to 80°. |
| consumer1 | WindPower | 15% | Set cooling setpoint to 75°. |
| consumer2 | Schedule | Asleep | Turn off TV outlet. Set heating setpoint to 62°. |
| consumer2 | CriticalityEvent | High | Turn off washing machine and dryer. |

CONSUMER DIRECTED ENERGY MANAGEMENT SYSTEMS AND METHODS

CROSS-REFERENCE TO RELATED APPLICATION(S)

This application is a continuation of U.S. patent application Ser. No. 12/555,751, entitled "Consumer Directed Energy Management Systems and Methods," filed on Sep. 8, 2009, which claims priority to U.S. Provisional Patent Application No. 61/095,244, entitled "Consumer Directed Energy Management System," filed on Sep. 8, 2008, both of which are incorporated herein by reference in their entireties.

TECHNICAL FIELD

The present technology relates to systems and methods for reducing residential energy usage. More specifically, the present technology relates to the use of consumer defined triggers for automatically adjusting the behavior of multiple energy consuming devices at the consumer's residence, for the purposes of reducing energy consumption.

BACKGROUND

Residential heating and cooling systems consume significant amounts of energy. Accordingly, energy management devices have been designed to regulate the operation of residential heating and cooling systems, in an effort to reduce the energy consumption of these systems. For example, self-contained, programmable thermostats allow consumers to set various heating or cooling setpoints that apply to different times of day.

Due to the generally limited nature of programmable thermostat user interfaces (e.g., small display, few buttons), programming such a thermostat is difficult. Moreover, such user interfaces provide limited functionality for programming and control. For example, a consumer's energy usage patterns may change quite often or in complex ways that are difficult or impossible to describe via a thermostat's user interface. For instance, a given consumer may have a late meeting one weeknight, and on another weekday may be home for the entire day instead of going to work. Setting a conventional thermostat to accommodate these behavioral changes requires a significant amount of programming. As a result, few thermostats are used effectively to reduce residential energy usage.

Systems available to consumers for controlling other residential energy loads are even more limited. Programmable timers can be used to switch on and off energy loads within a residence, but these timers have even more limited user interfaces than programmable thermostats. Programmable timers are typically limited to allowing a consumer to specify a few on and off times of an associated energy consuming device throughout the day. As with programmable thermostats, the ability to link programmable timers to consumers' changing schedules and preferences is unavailable.

In addition, in order to minimize peak usage on energy grids, utility companies have implemented direct control systems for large residential loads, such as heating and cooling systems, water heaters, and pool pumps. However, such direct load control systems usually have little or no consumer involvement. Instead, such systems allow the utility alone to define when a residential load is to be turned off, suiting only the energy reduction needs of the utility.

Existing direct load control systems have several disadvantages. For example, such systems treat each consumer in a given group the same as all other consumers in the group. These systems do not contemplate that each consumer may have different preferences regarding participation in utility-implemented load control events. Nor do these systems have methods whereby consumers can communicate such preferences to the utility. For example, on a given hot afternoon, some consumers in a load control region may be away from home, while others are at home. Even if a utility were able to achieve its desired load reduction by controlling the cooling systems of only those consumers who are away from home, the utility currently lacks techniques for determining such user schedules and/or preferences. Because the utility cannot determine the schedule and/or preferences of each user at a current time, the utility must resort to controlling all of the users in the load control region together. While current systems may allow a consumer to override a load control event once it has been scheduled or implemented, it would be preferable if the user could avoid participating in the load control event based on their status and/or preferences.

SUMMARY

Methods and systems for providing consumer directed energy management are described. Consumer defined triggers provide consumers and utilities with the ability to control residential energy usage. The techniques described herein enable consumers to manage multiple load control elements in their residences. A user interface is provided separately from the load control elements to allow the consumer to define his or her schedule and preferences for the purposes of controlling the multiple load control elements. In addition, the techniques described herein interface with other sources of information about consumer schedules and preferences, and automatically adjust settings on load control elements accordingly.

In some embodiments, the techniques described herein additionally provide an interface to a utility company for the purposes of energy load control. When the utility expects to implement a load control event, the techniques described herein allow the utility to monitor consumer schedules and/or preferences, in order to achieve the desired energy reduction while reducing the impact on participating consumers' comfort.

This Summary is provided to introduce a selection of concepts in a simplified form that are further described herein in the Detailed Description. This Summary is not intended to identify key features or essential features of the claimed subject matter, nor is it intended to be used as an aid in determining the scope of the claimed subject matter.

DETAILED DESCRIPTION

Methods and systems for providing consumer directed energy management are described. Consumer defined triggers provide consumers and utilities with the ability to control residential energy usage. The techniques described herein enable consumers to manage multiple load control elements in their residences. A user interface is provided separately from the load control elements to allow the consumer to define his or her schedule and preferences for the purposes of controlling the multiple load control elements. In addition, the techniques described herein interface with other sources of information about consumer schedules and preferences, and automatically adjust settings on load control elements accordingly.

In some embodiments, the techniques described herein additionally provide an interface to a utility company for the purposes of energy load control. When the utility expects to implement a load control event, the techniques described herein allow the utility to monitor consumer schedules and/or preferences, in order to achieve the desired energy reduction while reducing the impact on participating consumers' comfort. The techniques described herein overcome the limitations of existing residential load control systems, in addition to providing other benefits.

The techniques described herein enable consumers to manage multiple residential load control elements, including, but not limited to, remotely-controlled outlets, thermostats, and appliances. A user interface is provided separately from the load control elements to allow the consumer to define his or her schedule and preferences for the purposes of controlling the multiple load control elements. For example, a consumer's schedule may indicate when the consumer is asleep, when the consumer is awake but at home, and when the consumer is away from home. By separating the user interface from the load control elements, the consumer may define his or her schedule and preferences without the constraints of small, limited user interfaces associated with the load control elements. In addition, such a user interface allows the consumer to define his or her schedule and preferences once for many load control elements, instead of separately for each element.

In addition to allowing a consumer to define his or her schedule and preferences via a user interface, the techniques described interface with other sources of information about a consumer's schedule and/or preferences. These sources of information include location information from mobile phone networks, calendar information from electronic calendar applications, and other sources of information.

The techniques described herein allow the consumer to define various preferences, or triggers, for the purposes of reducing residential energy usage. For example, a consumer can define preferences relating to the price of energy. In some areas, the price of energy varies by time of day, season, and other factors. The techniques described herein allow consumers to set triggers related the price of energy and maintain connections to sources of energy price data, in order to automatically act on consumers' preferences when energy prices change. As another example, a consumer can define preferences related to energy sources (e.g., wind, solar, coal), such as in accordance with the consumer's sensitivity to the carbon footprint of generated energy. For instance, a consumer can specify that when large amounts of wind power are available on an energy grid, the consumer is willing to use more energy, since the environmental impact of the delivered energy is lower. The consumer can specify that when wind power becomes unavailable, the consumer's energy consumption should similarly be reduced (e.g., by changing the consumer's heating and/or cooling setpoints to reduce the amount of energy used by the heating and/or cooling systems).

In some embodiments, the techniques described herein additionally provide an interface to a utility company for the purposes of energy load control. When the utility expects to implement a load control event, the techniques described herein allow the utility to monitor consumer schedules and/or preferences, in order to achieve the desired energy reduction while reducing the impact on participating consumers' comfort. For example, the utility can determine the consumers whose schedules and/or preferences indicate that they are currently at home, and tailor the load control event to minimize the involvement and impact on consumers who are at home.

In some embodiments, consumers define voluntary energy reduction behavior associated with a series of utility-defined criticality levels. For example, a utility may define criticality levels of Low, Medium, High, and Critical. Consumers can specify different behaviors for each of these criticality levels, such as different heating and cooling setpoints, controllable outlets that are to be shut off at each level, and other behaviors. This information is used by the utility to determine how much energy load reduction is available at each criticality level, and to select the level that provides the desired energy reduction with the least impact on consumers.

The present disclosure describes embodiments of consumer directed energy management systems and methods. Several specific details are set forth in the following description and in the Figures to provide a thorough understanding of certain embodiments of the disclosure. One skilled in the art, however, will understand that the present disclosure may have additional embodiments, and that other embodiments of the disclosure may be practices without several of the specific features described herein, or with additional features.

1. EMBODIMENTS OF COMPUTING ENVIRONMENTS

Figure 1:
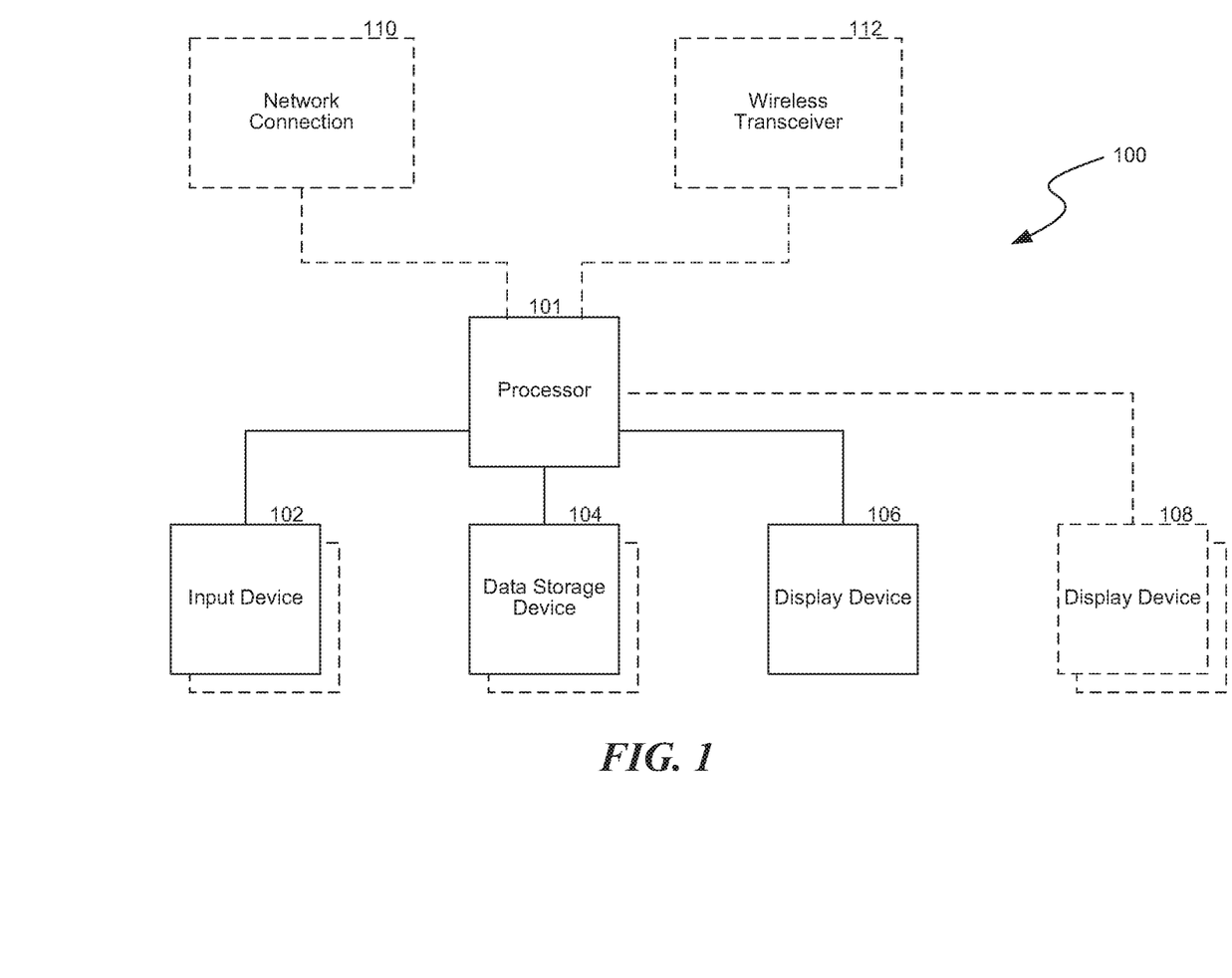
FIG. 1 is a block diagram of a computer system that may employ aspects of the disclosure.

FIG. 1 and the following discussion provide a general description of a suitable computing environment in which aspects of the disclosure can be implemented. Although not required, aspects and embodiments of the disclosure will be described in the general context of computer-executable instructions, such as routines executed by a general-purpose computer, e.g., a server or personal computer. Those skilled in the relevant art will appreciate that the disclosure can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The disclosure can be embodied in a special purpose computer or data processor that is specifically programmed, configured, or constructed to perform one or more of the computer-executable instructions explained in detail below. Indeed, the term "computer," as used generally herein, refers to any of the above devices, as well as any data processor.

The disclosure can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines may be located in both local and remote memory storage devices. Aspects of the disclosure described herein may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the disclosure may reside on a server computer, while corresponding portions reside on a client computer. Data structures and transmission of data particular to aspects of the disclosure are also encompassed within the scope of the disclosure.

Referring to FIG. 1, some embodiments of the disclosure employ a computer 100, such as a personal computer or workstation, having one or more processors 101 coupled to one or more user input devices 102 and data storage devices 104. The computer is also coupled to at least one output device such as a display device 106 and one or more optional additional output devices 108 (e.g., printer, plotter, speakers, tactile or olfactory output devices). The computer may be coupled to external computers, such as via an optional network connection 110, a wireless transceiver 112, or both.

The input devices 102 may include a keyboard and/or a pointing device such as a mouse or haptic device. Other input devices are possible such as a microphone, joystick, pen, touch screen, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, and other media. Indeed, any medium for storing or transmitting computer-readable instructions and data may be employed, including a connection port to or node on a network such as a local area network (LAN), wide area network (WAN) or the Internet (not shown in FIG. 1).

Aspects of the disclosure may be practiced in a variety of other computing environments. For example, referring to FIG. 2, a distributed computing environment with a network interface includes one or more computing devices 202 (e.g., a client computer) in a system 200, each of which includes a remote client module 204 that permits the computing device to access and exchange data with the network 206 (e.g., Internet or intranet), including web sites within the World Wide Web portion of the Internet. The computing devices 202 may be substantially similar to the computer described above with respect to FIG. 1. Computing devices 202 may include other program modules such as an operating system, one or more application programs (e.g., word processing or spread sheet applications), and the like. The computing devices 202 may be general-purpose devices that can be programmed to run various types of applications, or they may be single-purpose devices optimized or limited to a particular function or class of functions. While shown with remote client applications using Internet protocols or proprietary communication protocols for communication via network 206, any application program (e.g., network browser) for providing a graphical user interface to users may be employed, as described in detail herein.

Figure 2:
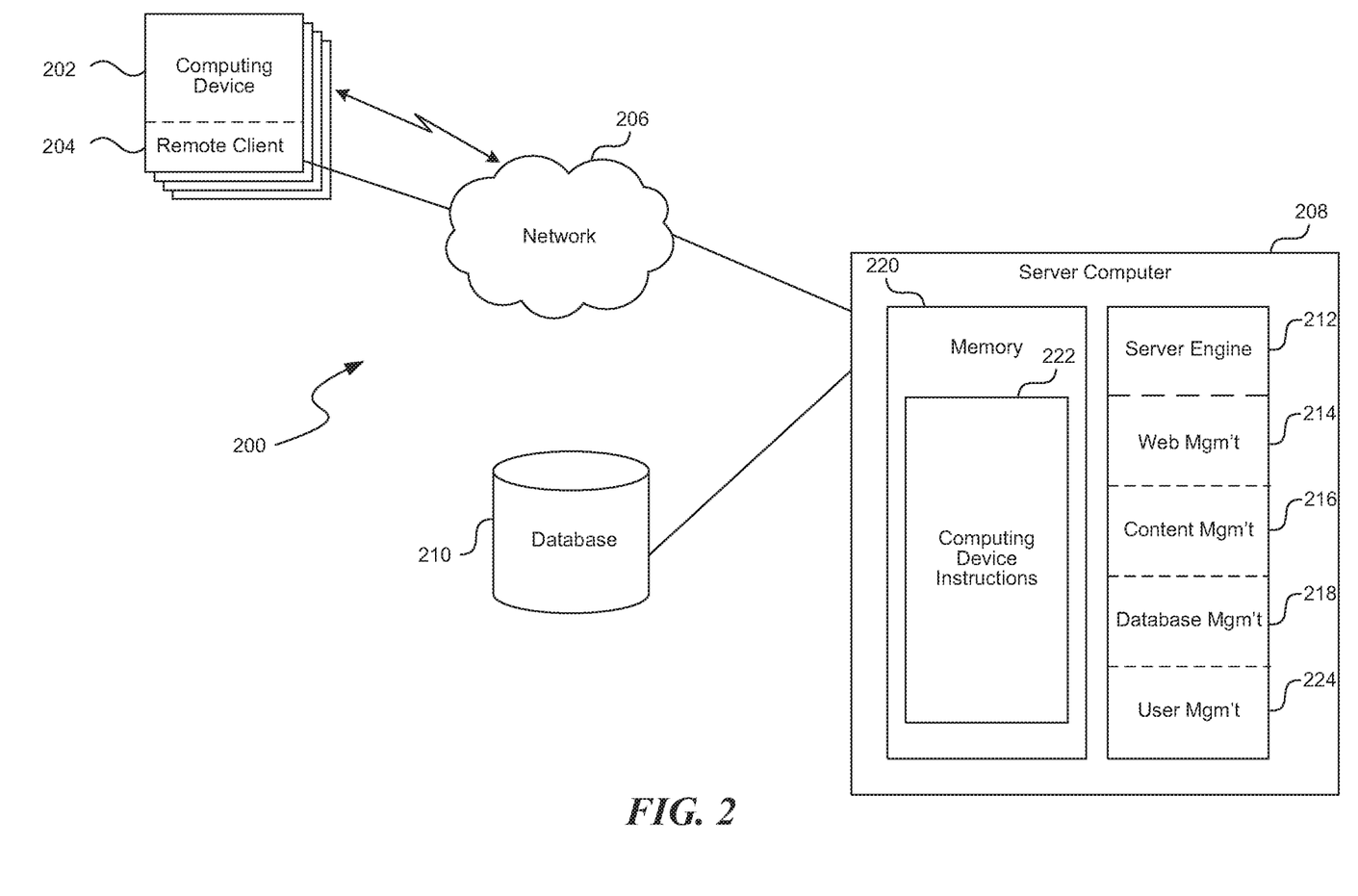
FIG. 2 is a block diagram of a computer system in which aspects of the disclosure may operate in a networked computer environment.

At least one server computer 208, coupled to the network 206 (e.g., Internet or intranet) 206, performs many or all of the functions for receiving, routing, and storing electronic messages, such as web pages, data streams, audio signals, and electronic images. While the Internet is discussed, a private network, such as an intranet, may indeed be preferred in some applications. The network may have a client-server architecture, in which a computer is dedicated to serving other client computers, or it may have other architectures such as peer-to-peer, in which one or more computers serve simultaneously as servers and clients. In some embodiments, a database 210 or databases, coupled to the server computer(s), can store much of the content exchanged between the computing devices 202 and the server 208. The server computer(s), including the database(s), may employ security measures to inhibit malicious attacks on the system, and to preserve integrity of the messages and data stored therein (e.g., firewall systems, secure socket layers (SSL), password protection schemes, encryption, and the like).

The server computer 208 can also contain an internal memory component 220. The memory 220 can be standard memory, secure memory, or a combination of both memory types. The memory 220 and/or other data storage device 210 can contain computer readable media having computing device instructions 222. The encoded computing device instructions 222 are electronically accessible to at least one of the computing devices 208 and 202 for execution. In further embodiments, computing device instructions 222 can include basic operating instructions (e.g., source code) or other instructions.

The server computer 208 may include a server engine 212, a web page management component 214, a content management component 216, a database management component 218 and a user management component 224. The server engine performs basic processing and operating system level tasks. The web page management component 214 handles creation and display or routing of web pages. Users may access the server computer by means of a URL associated therewith. The content management component 216 handles most of the functions in the embodiments described herein. The database management component 218 includes storage and retrieval tasks with respect to the database 210, queries to the database, read and write functions to the database and storage of data such as video, graphics, and audio signals. The user management component 224 can support authentication of a computing device to the server 208.

Many of the functional units described herein have been labeled as modules, in order to more particularly emphasize their implementation independence. For example, modules may be implemented in software for execution by various types of processors, such as processor 101. An identified module of executable code may, for instance, comprise one or more physical or logical blocks of computer instructions which may, for instance, be organized as an object, procedure, function, or algorithm. The identified blocks of computer instructions need not be physically located together, but may comprise disparate instructions stored in different locations which, when joined logically together, comprise the module and achieve the stated purpose for the module.

A module may also be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

2. CONSUMER DIRECTED ENERGY MANAGEMENT SYSTEMS AND METHODS

Methods and systems for providing consumer directed energy management are described. Consumer defined triggers provide consumers and utilities with the ability to control residential energy usage. The techniques described herein enable consumers to manage multiple load control elements in their residences. A user interface is provided separately from the load control elements to allow the consumer to define his or her schedule and preferences for the purposes of controlling the multiple load control elements. In addition, the techniques described herein interface with other sources of information about consumer schedules and preferences, and automatically adjust settings on load control elements accordingly.

In some embodiments, the techniques described herein additionally provide an interface to a utility company for the purposes of energy load control. When the utility expects to implement a load control event, the techniques described herein allow the utility to monitor consumer schedules and/or preferences, in order to achieve the desired energy reduction while reducing the impact on participating consumers' comfort.

Figure 3:
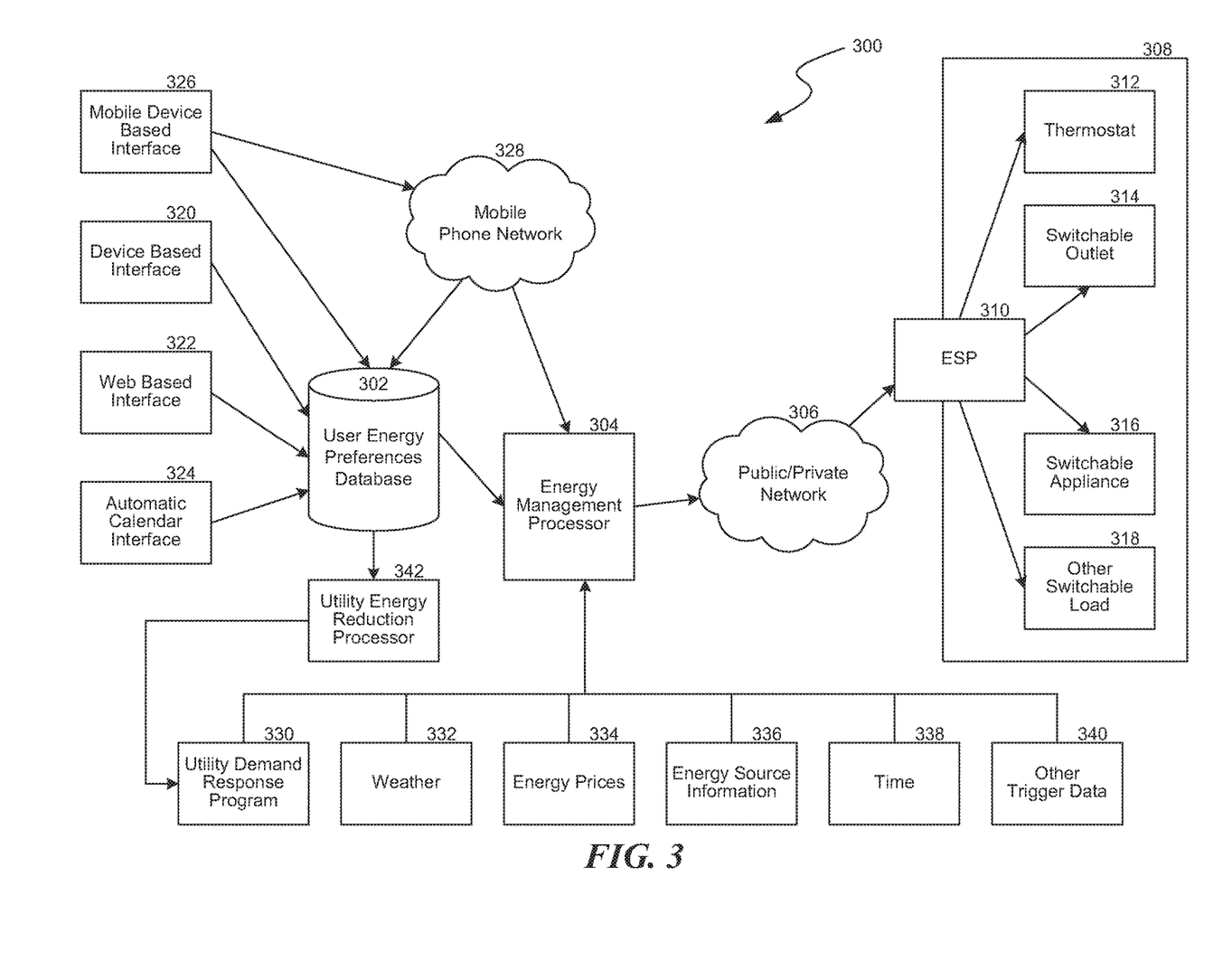
FIG. 3 is a block diagram of a system for providing consumer directed energy management in accordance with embodiments of the disclosure.

FIG. 3 is a block diagram of a system 300 for providing consumer directed energy management in accordance with embodiments of the disclosure. The system 300 includes a user energy preferences database 302 that stores information associated with a utility's consumers. In particular, the database 302 stores information about consumers' schedules and preferences related to residential energy usage.

In some embodiments, consumer preferences comprise a trigger, a level (or levels) of the trigger, and one or more actions related to load control elements that are to be performed when the trigger level is reached. A trigger may relate to the price of energy, the source of energy, a consumer's schedule, a utility defined criticality event, or a variety of other events and/or information. A consumer sets at least one level that applies to the trigger. For example, if the trigger is the price of energy, the consumer sets an energy cost (e.g., $0.25/kilowatt-hour (kWh)) at which the consumer desires settings to be changed on one or more residential load control elements. In addition, the consumer defines one or more actions regarding the residential load control elements that are to be taken when the trigger level is satisfied. For example, the consumer may set a particular heating or cooling setpoint for a thermostat. Together, the trigger, trigger level(s), and action(s) define consumer preferences regarding residential energy usage.

Figure 4:
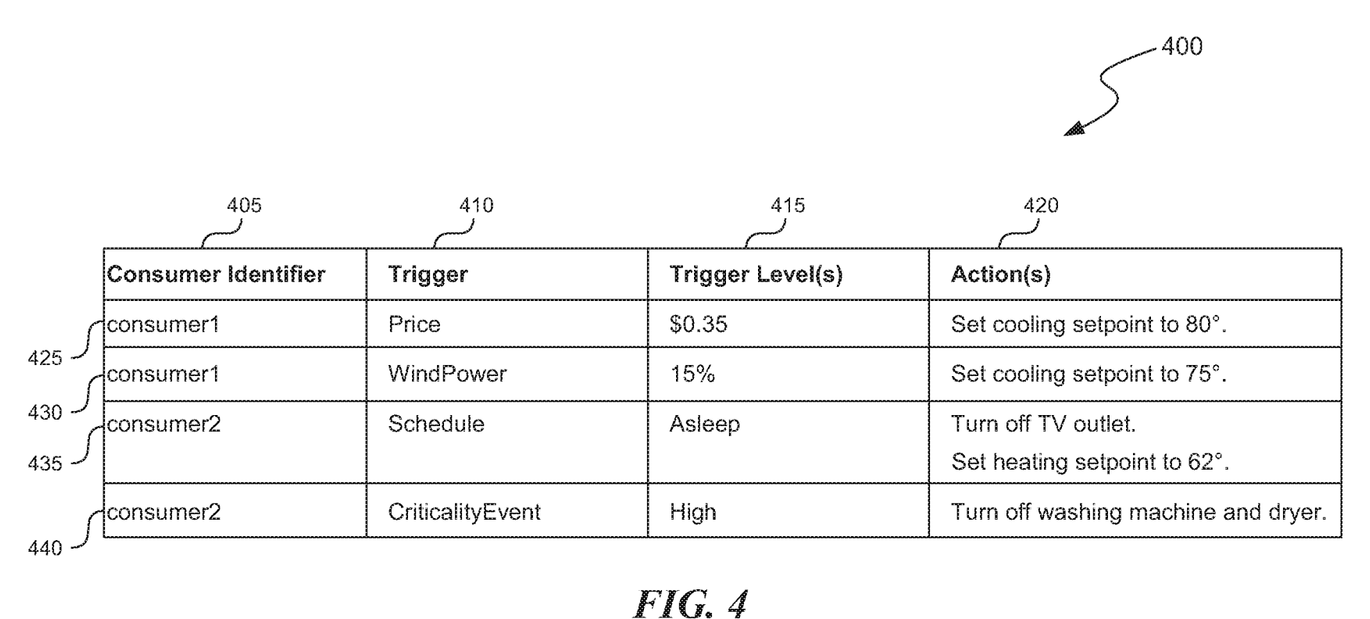
FIG. 4 is a block diagram of a data structure for storing consumers' preferences.

FIG. 4 is a block diagram of a representative data structure 400 that the user energy preferences database 302 can use to store consumers' preferences. One skilled in the art will appreciate that the data structure 400 is merely illustrative, and a variety of other data structures are possible. For example, each trigger type (e.g., price, source, schedule, criticality event) may be stored in a separate data structure.

The data structure 400 depicted in FIG. 4 includes consumer identifiers 405, triggers 510, trigger levels 415, and actions 420. A consumer identifier is a unique identifier associated with a consumer. The consumer identifier may be a string comprising alphanumeric characters, or another unique identifier. The consumer identifier is used to match the consumer's preferences with personal information associated with the consumer, including data identifying the consumer's home network, which is controlled in response to the consumer's preferences.

The data structure 400 depicted in FIG. 4 includes sample consumer preferences, illustrated by records 425 through 440. As described above, a consumer can define preferences relating to the price of energy. Record 425 represents a first consumer that desires his cooling setpoint to be set to 80 degrees when energy prices are above $0.35/kilowatt-hour (kWh). As another example, a consumer can define preferences related to energy sources. Record 430 represents a consumer who desires his cooling setpoint to be set to 75 degrees when greater than 15 percent of the energy is coming from wind power sources. Consumers can also define preferences related to their schedule, such as when they are home, away, or asleep. Record 435 represents a consumer that desires the outlet connected to his television to be turned off and his heating setpoint to be set to 62 degrees when his schedule shows that he is asleep. In addition, consumers can set preferences related to utility defined criticality events. Record 440 represents a consumer that desires his washing machine and dryer to be turned off when the utility indicates that there is a high criticality load control event. The records 425 through 440 included in the data structure 400 are included for illustrative purposes only. One skilled in the art will recognize that a variety of other records, triggers, trigger levels, and actions are contemplated by the techniques described herein. For example, a variety of other consumer preferences, whether defined by the utility or the consumer (whether in whole or in part) are usable to control associated load control elements.

Returning to FIG. 3, consumer preferences are used by an energy management processor 304 to control multiple load control devices in a consumer's residential network 308 via a network 306. The residential network 308 can be a wired and/or wireless network. In some embodiments, the residential network 308 includes devices configured according to a single network technology, while in other embodiments, the residential network 308 includes devices configured according to multiple network technologies. Available network technologies include, but are not limited to, IEEE 802.11/WiFi, IEEE 802.15.4/ZigBee, Homeplug, and other network technologies.

In some embodiments, the network 306 via which the energy management processor 304 communicates with the residential network 308 is a public network (e.g., Internet or an intranet), while in other embodiments, the network 306 is a private network (e.g., a Meter Reading Network or an Advanced Metering Infrastructure Network). The load control elements in the residential network 308 are connected to the network 306 via an Energy Service Portal (ESP) device 310. In some embodiments, the ESP device 310 functions may reside in one or more load control elements in the residential network 308. The load control elements can include a thermostat 312, a switchable outlet 314, a switchable appliance 316, and/or other switchable loads 318.

Consumer preferences in the user energy preferences database 302 can be set through a variety of user interfaces on a variety of different devices. FIG. 1 illustrates multiple user interfaces that a consumer may use to set his or her preferences, including a device based interface 320, a web based interface 322, an automatic calendar interface 324, and a mobile device based interface 326.

Figure 5:
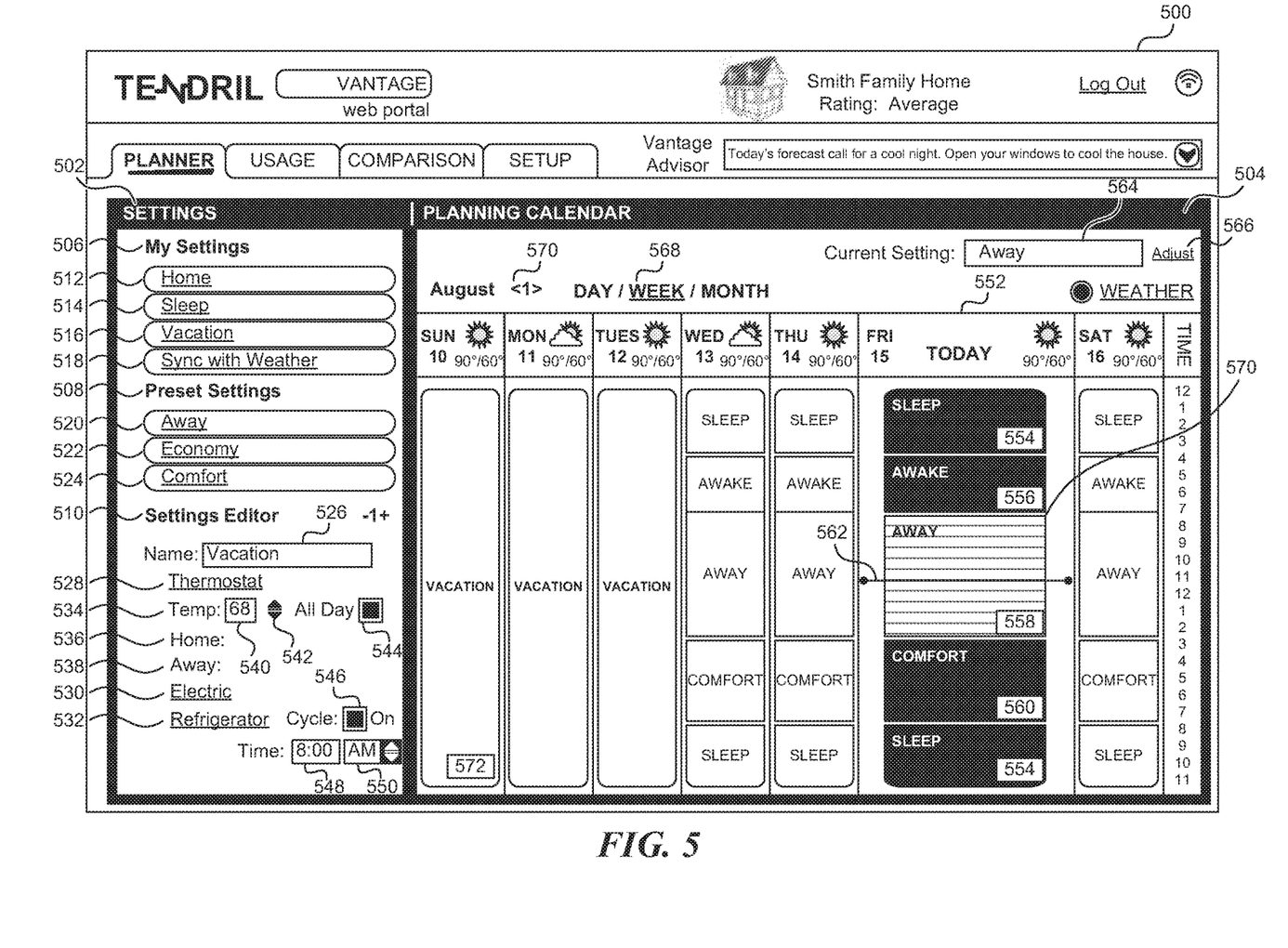
FIG. 5 is a screenshot of a web based user interface for setting consumer schedules and preferences.

FIG. 5 is a screenshot of a web based user interface 500 for setting consumer schedules and preferences in accordance with embodiments of the disclosure. The web based interface 500 corresponds to the web based interface 322 of FIG. 3, and includes Settings 502 and a Planning Calendar 504. Settings 502 include My Settings 506, which are defined by the consumer, Preset Settings 508, which are predefined by the system and/or utility, and a Settings Editor 510. In the example depicted in FIG. 5, the consumer has defined settings including Home 512, Sleep 514, Vacation 516, and Sync with Weather 518. Preset Settings 508 include Away 520, Economy 522, and Comfort 524.

Using the Settings Editor 510, the consumer defines one or more actions that are to be taken by the utility with regard to load control elements in the consumer's residential network, in accordance with an associated setting. To edit a setting in the Settings Editor 510, the consumer selects a setting from My Settings 506 or Preset Settings 508, such as by selecting a button or link associated with the setting text (e.g., by clicking on "Vacation" in My Settings 506), by typing in a setting in Name box 526, by selecting a setting from a drop down or other menu associated with the Name box 526, or in another manner. In the example depicted in FIG. 5, the user has selected the "Vacation" setting for editing.

Once a setting has been selected for editing, the consumer uses the Settings Editor 510 to define one or more actions with regard to load control elements that are to be associated with the selected setting. In the example depicted in FIG. 5, the consumer may define actions to be taken with regard to a Thermostat 528, Electricity 530, and a Refrigerator 532. For example, the consumer has selected a temperature 534 at which the Thermostat 528 is to be set. The consumer may select a temperature by typing a temperature in a box 540, selecting a temperature from a drop down or other menu associated with the box 540, using arrows 542 until a desired temperature is reached, or in another manner. If the consumer desires the selected temperature 534 to be maintained all day, the consumer may select the associated radio button 544. Otherwise, the consumer may set times 536 and 538 at which the consumer expects to be home and away, respectively, so that the thermostat may be adjusted accordingly.

In addition, in the example depicted in FIG. 5, the consumer has defined actions with regard to the Refrigerator 532. The consumer has selected radio button 546 to turn on the refrigerator cycle, and has entered a time using boxes and/or drop-down menus 548 and 550 that the cycle is to commence.

The Planning Calendar 504 of the web based user interface 500 allows the consumer to view and modify settings on a daily, weekly, or monthly basis. In the selected Week view 568, the consumer can view and modify the settings for a selected week. The consumer can change the selected week via the arrows 570, or in another manner. In some embodiments, the Planning Calendar 504 initially highlights the current day 552. The current time for the current day 552 is indicated by a timeline 562. In the example depicted in FIG. 5, the current day 522 includes two sleep setting blocks 554, an awake setting block 556, an away setting block 558, and a comfort setting block 560. In some embodiments, these blocks are color-coded or otherwise distinguished so that the consumer can easily identify the setting associated with a given block of time.

The consumer can modify the settings for a given day in a variety of ways. For example, the consumer can drag and drop an upper and/or lower boundary of a given block. For instance, if the consumer desires the away setting to begin at 7 a.m. instead of 8 a.m. as currently depicted in FIG. 5, the consumer may drag an upper boundary 570 of the away setting block 558 from 8 a.m. to 7 a.m. The bordering awake setting block 556 will be adjusted accordingly, ending at 7 a.m. instead of 8 a.m.

Alternatively or additionally, the consumer can modify the current setting by typing in a new setting in a Current Setting box 564 or selecting a new setting in a drop down or other menu associated with the Current Setting box 564. The consumer can also modify the current setting by selecting an Adjust link 566. Selection of the Adjust link 566 provides the consumer with a pop up or other menu from which the consumer may select a new setting.

In some embodiments, the consumer can apply a given setting or settings to multiple days, such as each weekday during the week, each weekend day, every Friday, or a sequence of selected days. For example, in the Planning Calendar 504 depicted in FIG. 5, the consumer has applied a Vacation setting 572 to the sequence of days Sunday, Monday, and Tuesday. The consumer may apply settings to multiple days in a variety of ways. For example, the consumer may select on the Planning Calendar 504 the days to which common settings are to be applied, and then select a setting in the Settings area 502. For example, the depicted consumer may have selected Sunday through Tuesday in the Planning Calendar 504 and then selected the Vacation setting 516 from My Settings 506. Alternatively or additionally, the consumer may drag and drop the Vacation setting 516 to the selected series of days, Sunday through Tuesday, or to each of these days individually.

Figure 6:
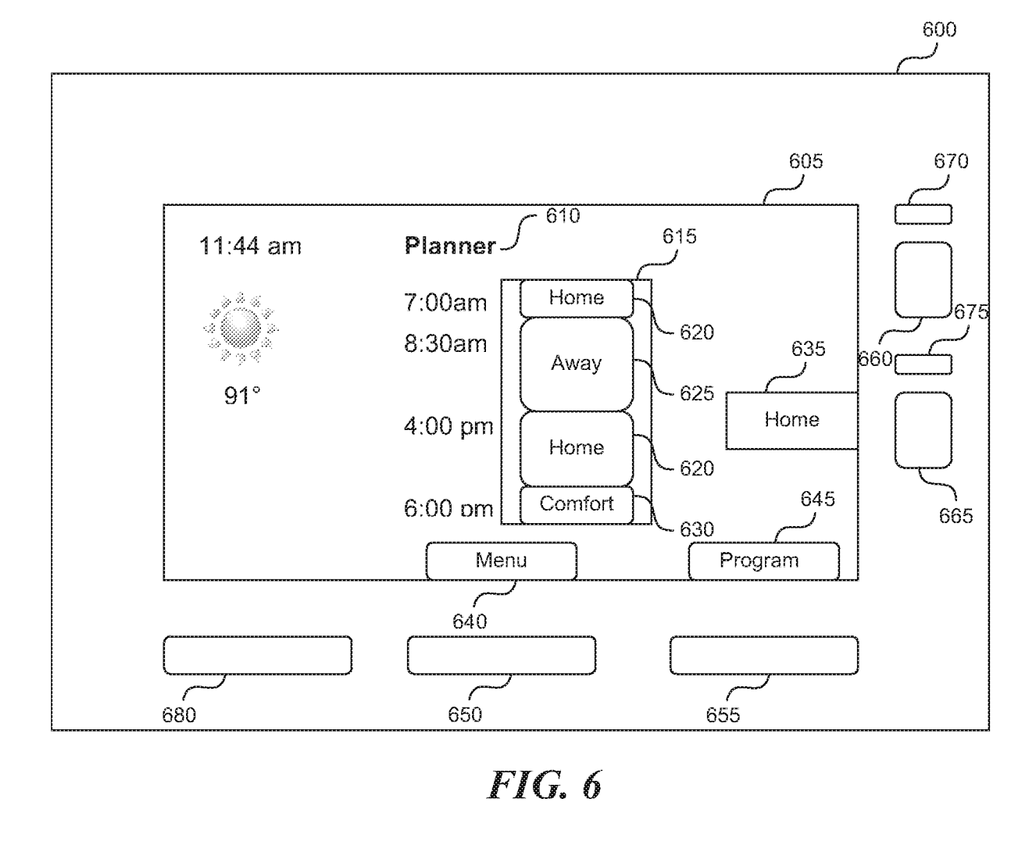
FIG. 6 is a screenshot of a device based user interface for setting consumer schedules and preferences.

Another user interface for setting consumer schedules and preferences is a device based user interface. FIG. 6 is a screenshot of a device 600 including a device based user interface 605 for setting consumer schedules and preferences in accordance with embodiments of the disclosure. The device based user interface 605 corresponds to the device based user interface 320 of FIG. 3, and is a simplified user interface designed to accommodate devices with limited display areas and/or less sophisticated user interfaces. In some embodiments, the device based user interface is operated by associated buttons, including buttons 650, 655, 660, 665, and 680. Alternatively or additionally, the device based user interface may be operated by voice recognition software, a touchscreen display, or a combination of these and other technologies.

The device based user interface 605 includes a Planner 610 that includes a schedule 615 for a selected day. In some embodiments, the Planner 610 displays the current day as the selected day by default. In the example depicted in FIG. 6, the schedule 615 includes two home setting blocks 620, an away setting block 625, and a comfort setting block 630. These settings can be modified by the consumer in a variety of ways. For example, the consumer can modify the Home setting by selecting the button 665 associated with the Home setting. In some embodiments, the consumer presses the button 665 for a short duration to scroll through available settings, and presses the button 665 for a longer duration to select the displayed setting for editing. In addition, the consumer can modify available settings by selecting the Menu 640 via associated button 650 and/or Program via associated button 655.

The device 600 may include a variety of indicators 670 and 675 to communicate information to the user. For example, indicators 670 and 675 may be light emitting diodes (LEDs) that communicate device 600 status information to the user, such as whether the device is on or off, which setting is currently active, and/or a variety of other status information.

Another user interface for setting consumer schedules and preferences is an automatic calendar interface 324. The automatic calendar interface 324 obtains calendar and schedule information automatically from external calendar programs, such as computer, device, and web based calendar applications. The data obtained from these calendar programs is used to determine when a consumer is home or away from home, in addition to other schedule and/or preference information.

Figure 7:
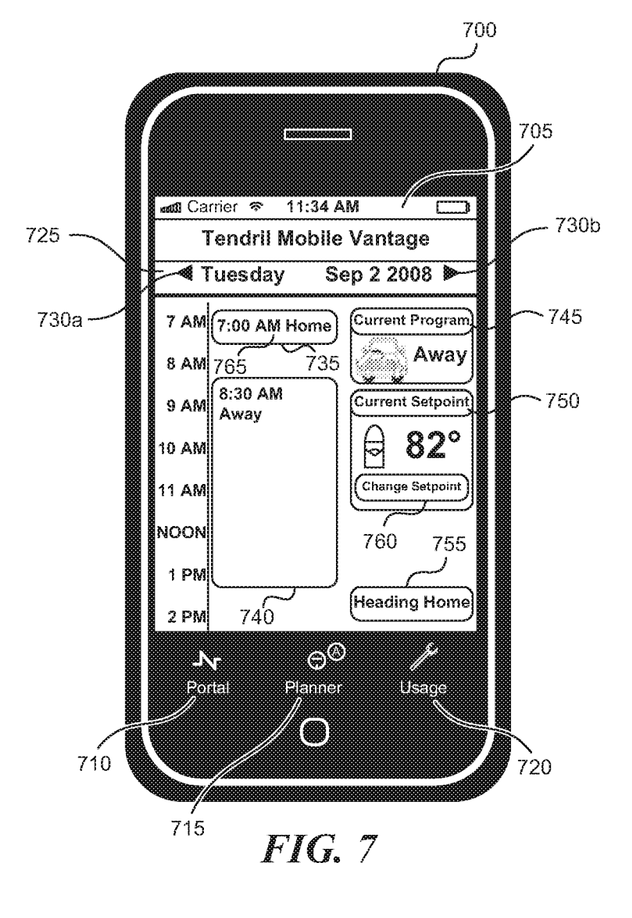
FIG. 7 is a screenshot of a mobile device based user interface for setting consumer schedules and preferences.

In addition, a consumer can set his or her schedule and preferences via a mobile device based user interface. FIG. 7 is a screenshot of a mobile device 700 including a mobile device based user interface 705 for setting consumer schedules and preferences in accordance with embodiments of the disclosure. The mobile device based user interface 705 corresponds to the mobile device based user interface 326 of FIG. 3. The mobile device based user interface 705 allows a consumer to access a mobile energy portal 710, a planning calendar 715, and energy usage data 720. In the example depicted in FIG. 7, the planning calendar 715 is the currently selected program.

In some embodiments, when the consumer selects the planning calendar 715, the mobile device based user interface 705 displays calendar data for the current day 725. The consumer can change the selected day by using the arrows 730a and 730b, by sliding his or her finger across the device 700 screen, or in another manner. In the example depicted in FIG. 7, the calendar data for the current day 725 includes two setting blocks: Home 735 and Away 740. As with the web based planning calendar 504 depicted in FIG. 5, the consumer can modify the settings for a given day in a variety of ways. For example, the consumer can drag and drop, pull, or otherwise adjust an upper and/or lower boundary of a given setting block. For instance, if the consumer desires the home setting to remain in effect until 9:00 AM instead of 8:30 AM as currently depicted in FIG. 7, the consumer may pull a lower boundary 765 of the Home setting block 735 from 8:30 AM to 9:00 AM. The bordering Away block 740 will be adjusted accordingly, beginning at 9:00 AM instead of 8:30 AM.

Alternatively or additionally, the consumer can modify the current setting by selecting the Current Program box 745, selecting one of the setting blocks 735 or 740, or in another manner. Such a selection provides the consumer with a pop up or other menu from which the consumer may select a new setting.

The mobile device based user interface 705 also includes information about actions associated with the current setting, such as the Current Setpoint 750. In the example depicted in FIG. 7, the current setpoint is set to 82°. The consumer can change the current setpoint by selecting the Current Setpoint button 760. Selection of the Current Setpoint button 760 provides the consumer with a pop up or other menu from which the consumer may select a new setpoint.

In some embodiments, the mobile device based user interface 705 provides consumers with additional means to control their schedules and/or preferences. For example, when a consumer is headed home, the consumer may select the Heading Home button 755. In some embodiments, selection of this button 755 signals the home network that it should begin transitioning to an at-home setting, such as Home or Comfort. For example, in some embodiments, the home network transitions to the next at-home setting on the user's schedule. For instance, the consumer's schedule may indicate that he is Away until 2:00 PM and that the Comfort setting should begin at 2:00 PM. If the consumer selects the Heading Home button 755 at noon, the home network will begin transitioning from the Away setting to the Comfort setting at this time, rather than waiting until 2:00 PM.

In some embodiments, the mobile device user interface 705 utilizes data available from one or more mobile phone networks, such as mobile phone network 328 depicted in FIG. 3. Such data indicates the consumer's geographic location and/or other data. In such embodiments, the techniques described herein utilize the available geographic location data to automatically determine if the consumer is home or away from home, without requiring any interaction from the consumer. Such data triggers preferences associated with the consumer's schedule, such as those that differ whether the consumer is home or away from home. In this and other ways, the mobile device user interface 705 simplifies the operation of the techniques described herein, by obtaining schedule and preference information without requiring manual entry of such information by a consumer.

Returning to FIG. 3, an energy management processor 304 obtains user preferences and other information from the user energy preferences database 302. In addition, the energy management processor 304 obtains trigger data from a variety of sources, such as a utility demand response program 330, weather 332, energy prices 334, energy source information 336 (e.g., wind, solar, or coal), time 338, and/or other trigger data 340. When trigger data changes, the energy management processor 304 examines the preference data in the user energy preferences database 302 in order to determine whether any actions are to be taken in the consumer's home network. For example, if the time advances from 11:59 a.m. to 12:00 p.m., the energy management processor 304 examines the user preferences to determine if any consumers' schedule has a new setting or activity beginning at 12:00 p.m. If such a setting or activity is discovered, and a change to a device is required, the energy management processor 304 communicates the change to the ESP device 310 of the consumer's residential network 308 via the network 306. In turn, the ESP device 310 communicates the updated setting information over the residential network 308 to the device or devices that require the setting update.

In some embodiments, a utility energy reduction processor 342 enables utilities to implement demand response programs in a manner that minimizes the impact on consumers, in addition to achieving other benefits. The utility energy reduction processor 342 enables a utility to search consumer preferences in the user energy preferences database 302. For example, the utility can search for information regarding consumers that are willing to reduce their energy usage under specific scenarios. As described in additional detail herein, a utility may have predefined one or more criticality levels, such as Critical, High, Medium, and Low. Users can volunteer to reduce their energy consumption in association with one or more of these levels, such as by defining one or more actions that are to be taken in association with a criticality level.

The utility energy reduction processor 342 provides the utility with information about the amount and type of energy reduction available to the utility under each criticality level. For example, the utility energy reduction processor 342 may indicate that at a Medium criticality level, the utility achieves a 10% reduction in energy usage, and that 82% of that reduction is in traditional power sources, 10% of that reduction is in wind power sources, and 8% is in other power sources. In addition, the utility energy reduction processor 342 is capable of providing more detailed information, such as providing information about only those consumers who are currently away from home. Utilizing the information provided by the utility energy reduction processor 342, the utility can make decisions about which criticality level should be set to achieve the desired energy reduction. Moreover, the utility energy reduction processor 342 enables the utility to create a demand response program that minimizes the impact on consumers, such as by changing settings only among consumers whose preferences and/or schedules indicate that they are away from home.

The utility provides information obtained from the utility energy reduction processor 342 to the energy management processor 304 via the utility demand response program 330 trigger. The energy management processor 304 sends the appropriate control signals to the ESP device 310 of the consumer's residential network 308 to implement any associated energy reduction.

3. CONCLUSION

Various embodiments of the disclosure are described herein. It will be appreciated that details set forth herein are provided to describe the embodiments in a manner sufficient to enable a person skilled in the relevant art to make and use the disclosed embodiments. Several of the details and advantages, however, may not be necessary to practice some embodiments. Additionally, some well-known structures or functions may not be shown or described in detail, so as to avoid unnecessarily obscuring the relevant description of the various embodiments. Furthermore, features, structures, or characteristics of various embodiments may be combined in any suitable manner.

Moreover, one skilled in the art will recognize that there are a number of other technologies that could be used to perform functions similar to those described herein. While processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The terminology used in the description is intended to be interpreted in its broadest reasonable manner, even though it is being used in conjunction with a detailed description of identified embodiments. Moreover, the headings provided herein are for convenience only.

Unless the context clearly requires otherwise, throughout the disclosure, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

Any patents, applications and other references, including any that may be listed in accompanying filing papers, are incorporated herein by reference. Aspects of the disclosure can be modified, if necessary, to employ the systems, functions, and concepts of the various references described above to provide yet further embodiments.

These and other changes can be made in light of the above Detailed Description. While the disclosure details certain embodiments and describes the best mode contemplated, no matter how detailed, various changes can be made. Implementation details may vary considerably, while still being encompassed by the disclosure.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method, performed by a computing system having a memory and a processor, for providing consumer directed energy management, the method comprising:
   receiving first information from a first source associated with a consumer's preferences regarding one or more energy consuming devices in the consumer's energy network;
   automatically receiving second information from a second source different than the first source,
      wherein the second information comprises a consumer's schedule relative to the one or more energy consuming devices, wherein the consumer's schedule includes a location related to the consumer, and
      wherein the second source comprises an external scheduling program;
   storing a consumer preferences database configured to,
      store the first information and the second information, wherein the consumer's preferences include triggers, trigger levels, and actions associated with the one or more energy consuming devices, and
      provide the first information and the second information to an energy management processor;
   receiving the first information and the second information from the consumer preferences database;
   selecting an action from the consumer's preferences for an energy consuming device based on at least a portion of the received first information and the received second information including the consumer's schedule and the location related to the consumer; and
   transmitting control instructions to the consumer's energy network, wherein the control instructions include the selected action, wherein the selected action is taken when at least one of the trigger levels associated with the selected action is reached.

2. The method of claim 1, wherein at least one of the triggers is selected from a group consisting of energy price, energy source, the consumer's schedule, and a criticality event defined by a utility.

3. The method of claim 1, further comprising:
   providing a user interface by which the consumer defines the consumer's preferences.

4. The method of claim 3, wherein the user interface is a web-based user interface.

5. The method of claim 3, wherein the user interface is a mobile-device based user interface.

6. The method of claim 3, wherein the user interface is a device-based user interface.

7. The method of claim 1, wherein the selected action is to send one or more control instructions to at least one energy consuming device in the consumer's energy network to limit demand on at least one type of energy source so that the demand on the at least one type energy source is limited in response to determining that the trigger level has been reached.

8. The method of claim 1, wherein the energy management processor further receives trigger data from one or more data sources, and wherein the selected action is determined based on the received information associated with the consumer's preferences and the received trigger data.

9. The method of claim 1, wherein the consumer's energy network is configured according to a ZigBee Smart Energy protocol.

10. The method of claim 1, further comprising:
obtaining the consumer's preferences from the consumer preferences database; and
providing energy reduction data to the energy management processor, wherein the energy reduction data indicates a reduction in energy associated with a criticality event, wherein the energy reduction data is determined based on the obtained consumer's preferences.

11. A system for providing consumer directed energy management, the system comprising:
a consumer preferences database configured to,
receive first information from a first source associated with a consumer's preferences regarding one or more energy consuming devices in the consumer's energy network;
automatically receive second information from a second source different than the first source,
wherein the second information comprises a consumer's schedule relative to the one or more energy consuming devices, wherein the consumer's schedule includes a location related to the consumer, and
wherein the second source comprises an external scheduling program;
store the first information and the second information, wherein the consumer's preferences include triggers, trigger levels, and actions associated with the one or more energy consuming devices, and
provide the first information and the second information to an energy management processor; and
an energy management processor configured to,
receive the first information and the second information from the consumer preferences database,
select an action from the consumer's preferences for an energy consuming device based on at least a portion of the received first information and the received second information including the consumer's schedule and the location related to the consumer, and
transmit control instructions to the consumer's energy network, wherein the control instructions include the selected action, wherein the selected action is taken when at least one of the trigger levels associated with the selected action is reached.

12. The system of claim 11, wherein the selected action is to send one or more control instructions to at least one energy consuming device in the consumer's residential energy network to limit demand on a type of energy source so that the system is configured to limit demand on the type of energy source in response to determining that a percentage of energy provided by the type of energy source exceeds at least one preset limit.

13. The system of claim 11, wherein the energy management processor further receives trigger data from one or more data sources, and wherein the selected action is determined based on the received information associated with the consumer's preferences and the received trigger data.

14. The system of claim 11, further comprising:
a user interface by which the consumer defines the consumer's preferences.

15. The system of claim 14, wherein the user interface is at least one of a web-based user interface and a device-based interface.

16. The system of claim 11, further comprising:
a utility energy reduction processor configured to,
obtains the consumer's preferences from the consumer preferences database, and
provides energy reduction data to the energy management processor, wherein the energy reduction data indicates a reduction in energy associated with a criticality event, wherein the energy reduction data is determined based on the obtained consumer's preferences.

17. The system of claim 11, wherein at least one of the triggers is selected from a group consisting of energy price and energy source.

18. A computer-readable medium, that is not a transitory, propagating signal, storing instructions that, if executed by a computing system having a memory and a processor, cause the computing system to perform a method for providing consumer directed energy management, the method comprising:
storing a consumer preferences database configured to,
receive first information from a first source associated with a consumer's preferences regarding one or more energy consuming devices in the consumer's energy network;
automatically receive second information from a second source different than the first source,
wherein the second information comprises a consumer's schedule relative to the one or more energy consuming devices, wherein the consumer's schedule includes a location related to the consumer, and
wherein the second source comprises an external scheduling program;
store the first information associated and the second information, wherein the consumer's preferences include triggers, trigger levels, and actions associated with the one or more energy consuming devices, and
provide the first information and the second information to an energy management processor;
receiving the first information and the second information from the consumer preferences database;
selecting an action from the consumer's preferences for an energy consuming device based on at least a portion of the received first information and the received second information including the consumer's schedule and the location related to the consumer; and
transmitting control instructions to the consumer's energy network, wherein the control instructions include the selected action, wherein the selected action is taken when at least one of the trigger levels associated with the selected action is reached.

19. The computer-readable medium of claim 18, wherein the selected action is to adjust a setpoint of the at least one controllable device in response to determining that a percentage of energy provided to the consumer by a first type of energy source exceeds a threshold percentage.

20. The computer-readable medium of claim 18, wherein at least one of the triggers is selected from a group consisting of the consumer's schedule and a criticality event defined by a utility.

* * * * *